(12) United States Patent
Shibata et al.

(10) Patent No.: US 9,509,193 B2
(45) Date of Patent: Nov. 29, 2016

(54) MOTOR ACTUATOR

(71) Applicant: ASMO CO., LTD., Kosai, Shizuoka-pref. (JP)

(72) Inventors: Naohiko Shibata, Hamamatsu (JP); Hiroto Inoue, Toyohashi (JP)

(73) Assignee: ASMO CO., LTD., Kosai (JP)

(*) Notice: Subject to any disclaimer, the term of this patent is extended or adjusted under 35 U.S.C. 154(b) by 113 days.

(21) Appl. No.: 14/504,437

(22) Filed: Oct. 2, 2014

(65) Prior Publication Data

US 2015/0108860 A1    Apr. 23, 2015

(30) Foreign Application Priority Data

Oct. 17, 2013  (JP) ................................. 2013-216645
Aug. 26, 2014  (JP) ................................. 2014-172008

(51) Int. Cl.
| | | |
|---|---|---|
| *H02K 11/00* | (2016.01) | |
| *H02K 5/10* | (2006.01) | |
| *H02K 7/10* | (2006.01) | |
| *H02K 7/116* | (2006.01) | |
| *H02K 5/22* | (2006.01) | |

(52) U.S. Cl.
CPC .............. *H02K 7/116* (2013.01); *H02K 5/225* (2013.01); *H02K 11/33* (2016.01)

(58) Field of Classification Search
CPC .............................. H02K 7/116; H02K 11/38
USPC ..................................... 310/71, 75 R, 83, 98
See application file for complete search history.

(56) References Cited

U.S. PATENT DOCUMENTS

| | | | | |
|---|---|---|---|---|
| 5,394,039 A | * | 2/1995 | Suchdev | .................. H02K 5/24 173/162.2 |
| 2006/0053920 A1 | * | 3/2006 | Kawamura | ....... B60R 25/02153 74/425 |

FOREIGN PATENT DOCUMENTS

| | | | |
|---|---|---|---|
| JP | 05252692 A | * | 9/1993 |
| JP | 2006115670 A | * | 4/2006 |
| JP | 2013-90502 A | | 5/2013 |

* cited by examiner

*Primary Examiner* — Jose Gonzalez Quinones
(74) *Attorney, Agent, or Firm* — SOLARIS Intellectual Property Group, PLLC

(57) ABSTRACT

A motor actuator of the present invention includes: a motor including an outer shell portion internally provided with a rotor that rotates as a unit with a rotation shaft, and supported portions respectively provided at both axial direction end portions of the outer shell portion; a power supply terminal connected to the motor; a case internally housing the motor, and including support portions; a resilient member fitted interposed between each of the support portions and the supported portions; and an insulating member disposed between the outer shell portion and the power supply terminal, nipped between an outer peripheral portion of the outer shell portion and the resilient member, and formed with a cut-out hole at a location to the radial direction outer side of a location in contact with the resilient member, and at the radial direction inner side of an outer peripheral portion of the outer shell portion.

6 Claims, 6 Drawing Sheets

MOTOR ACTUATOR

CROSS-REFERENCE TO RELATED APPLICATION

This application claims priority under 35 USC 119 from Japanese Patent Application No. 2013-216645 filed Oct. 17, 2013, and Japanese Patent Application No. 2014-172008 filed Aug. 26, 2014, the disclosures of which are incorporated by references herein.

BACKGROUND

Technical Field

The present invention relates to a motor actuator.

Related Art

Japanese Patent Application Laid-Open (JP-A) No. 2013-90502 describes a motor actuator employed to open and close an air duct switching door configuring a portion of a vehicle air conditioner. The motor actuator is configured including a case configuring an outer shell of the motor actuator, and a motor that is supported by a support portion (a cover side support plate and a case side support plate) provided inside the case. A resilient member (O-ring) is fitted interposed between the motor and the support portion such that the motor is supported in a floating state by the case.

The configuration described in JP-A No. 2013-90502 is useful technology from the perspective of suppressing transmission of vibration of the motor to the case, however in a configuration in which an insulation plate is provided between the motor and the resilient member in order to secure insulating properties between the motor and a power supply terminal, it is conceivable that a reaction force input to the resilient member due to flexing of the insulation plate could cause the resilient member to come away from the support portion of the case.

SUMMARY

In consideration of the above circumstances, the present invention provides a motor actuator capable of suppressing a resilient member provided between a motor and a case from coming away from a specific position, while securing insulating properties between the motor and a power supply terminal.

A motor actuator of a first aspect of the present invention includes: a motor including an outer shell portion internally provided with a rotor that rotates as a unit with a rotation shaft, and supported portions respectively provided at both axial direction end portions of the outer shell portion; a power supply terminal connected to the motor; a case that internally houses the motor, and that includes support portions that support the supported portions; a resilient member that is fitted interposed between each of the support portions and the supported portions, and that suppresses vibration of the motor from being transmitted to the case; and an insulating member that is disposed between the outer shell portion and the power supply terminal, that is nipped between an outer peripheral portion of the outer shell portion and the resilient member, and that is formed with a cut-out hole at a location to the radial direction outer side of a location in contact with the resilient member, and at the radial direction inner side of an outer peripheral portion of the outer shell portion.

According to the motor actuator of the first aspect, power is passed through the motor through the power supply terminal, causing the rotation shaft to rotate. Namely, the motor actuator actuates. In the motor actuator, each resilient member is fitted interposed between the supported portion of the motor and the support portion of the case, namely the motor is supported in a floating state by the case. Vibration of the motor is accordingly suppressed from being transmitted to the case, achieving a reduction in vibration and a reduction in noise of the motor actuator.

The motor actuator is provided with the insulating member between the outer shell portion of the motor and the power supply terminal, thereby securing insulating properties between the outer shell portion of the motor and the power supply terminal. The insulating member is nipped between the outer peripheral portion of the outer shell portion of the motor and the resilient member. A resilient recovery force of the insulating member attempting to regain its original shape is accordingly input from the insulating member to the resilient member, and so it might be imagined that the resilient member could come away from between the supported portion of the motor and the support portion of the case. However, in the motor actuator, this resilient recovery force is lessened due to forming the cut-out hole in the insulating member at the location described above. The resilient member can accordingly be suppressed from coming away from between the supported portion of the motor and the support portion of the case.

A motor actuator of a second aspect of the present invention is the motor actuator of the first aspect, wherein at least of portion of edge portion of the cut-out hole is curved or bent into a protruding shape toward the support portion side as viewed along the axial direction.

A motor actuator of a third aspect of the present invention is the motor actuator of the first aspect, wherein: an edge portion of the supported portion is formed in a circular shape as viewed along the axial direction; the resilient member is configured by an O-ring that is disposed at the radial direction outer side of the supported portion and that is formed in a ring shape as viewed along the axial direction; and a radial direction outside edge portion and a radial direction inside edge portion of the cut-out hole are respectively formed in circular arc shapes as viewed along the axial direction.

According to the motor actuator of the second aspect or the third aspect, the radial direction outer side and radial direction inside edge portions of the cut-out hole formed at the insulating member are respectively formed in circular arc shapes as viewed along the axial direction. The load distribution of the resilient recovery force input from the insulating member to the O-ring can accordingly be made more uniform around the circumferential direction of the O-ring. The resilient member can accordingly be even better suppressed from coming away from between the supported portion of the motor and the support portion of the case.

A motor actuator of a fourth aspect of the present invention includes: a motor including an outer shell portion internally provided with a rotor that rotates as a unit with a rotation shaft, and supported portions respectively provided at both axial direction end portions of the outer shell portion; a power supply terminal connected to the motor; a case that internally houses the motor, and that includes support portions that support the supported portions; a resilient member that is fitted interposed between each of the support portions and the supported portions, and that suppresses vibration of the motor from being transmitted to the case; and an insulating member that is disposed between the outer shell portion and the power supply terminal, and that is nipped between an outer peripheral portion of the outer shell portion and the resilient member; wherein the case is configured with a split structure configured by attaching a first case to a second case, with the support portions respectively provided at the first case and the second case, and a location of the insulating member on the side of the support portion provided at the first case configures an escape portion with an edge portion positioned further to the radial direction inner side than the outer peripheral portion of outer shell portion outer peripheral portion.

According to the motor actuator of the fourth aspect, the escape portion configured as described above is provided at the insulating member. Accordingly, a location of the insulating member on the side of the support portion provided at the first case is not liable to stick out at an axial direction end portion of the outer shell portion when nipping the insulating member between the outer peripheral portion of the outer shell portion and the resilient member. The support portion of the first case can accordingly be suppressed from catching on the insulating member when attaching the first case to the second case in a supported state of the supported portions of the motor by the support portions of the second case.

A motor actuator of a fifth aspect of the present invention is the motor actuator of the third aspect, wherein a dimension of the escape portion as viewed along the axial direction of the motor is set larger than a dimension of the support portion provided at the first case as viewed along the axial direction of the motor.

According to the motor actuator of the fifth aspect, the support portion of the first case can be further suppressed from catching on the insulating member when attaching the first case to the second case, due to setting the dimensions of the escape portion and the support portion provided at the first case in the above manner.

A motor actuator of a sixth aspect of the present invention is the motor actuator of the third aspect, wherein escape portions are provided at both a location of the insulating member on the side of the support portion provided at the first case, and a location of the insulating member on the side of the support portion provided at the second case.

According to the motor actuator of the sixth aspect, restrictions to the direction of the insulating member when assembling the insulating member to the motor can be relaxed due to providing the escape portions to both the first case side and the second case side of the insulating member. Good ease of operation can accordingly be obtained during assembly of the insulating member to the motor.

BRIEF DESCRIPTION OF THE DRAWINGS

Exemplary embodiments of the present invention will be described in detail based on the following figures, wherein.

DETAILED DESCRIPTION

Figure 1:
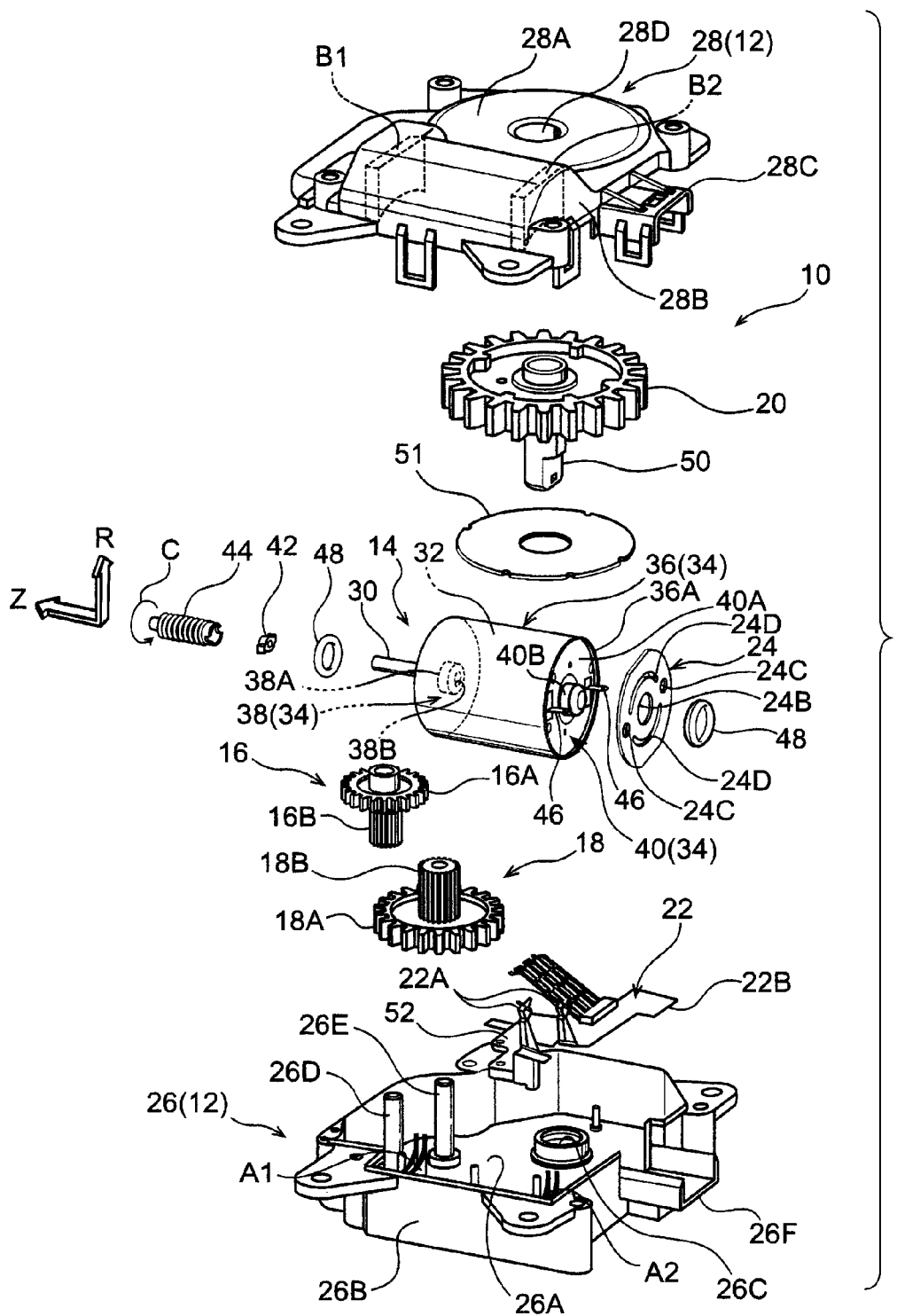
FIG. 1 is an exploded perspective view illustrating a motor actuator of an exemplary embodiment.

Explanation follows regarding a motor actuator according to an exemplary embodiment of the present invention, with reference to FIG. 1 to FIG. 4. Note that in the drawings, the arrow Z direction, the arrow R direction, and the arrow C direction respectively indicate an axial direction, radial direction, and circumferential direction of a motor, as appropriate. In the following explanation, reference simply to the axial direction, radial direction, and circumferential direction refers to the axial direction, radial direction, and circumferential direction of the motor, unless specifically indicated otherwise.

As illustrated in FIG. 1, a motor actuator 10 according to the present exemplary embodiment includes a case 12 configuring an outer shell of the motor actuator 10, a motor 14 disposed inside the case 12, a primary gear 16, counter gear 18, and final gear 20 that together reduce the revolutions of the motor 14 by a specific gear ratio, and a power supply terminal 22 that supplies power to the motor 14. An insulation plate 24 is provided between the motor 14 and the power supply terminal 22, and serves as an insulating member, this being a relevant portion of the present exemplary embodiment.

The case 12 is configured including an upper case 28, serving as a first case, and a lower case 26, serving as a second case, that can be separated along the axial direction of the final gear 20, described later. The lower case 26 is formed in a bottomed box shape open toward the upper case 28 side, and includes a bottom wall 26A extending along the axial direction of the motor 14, and a side wall 26B extending in a curve from an outer peripheral edge of the bottom wall 26A toward the upper case 28 side. The bottom wall 26A is formed with an insertion hole 26C, through which is inserted an output shaft 50 provided at an axial center portion of the final gear 20. A pair of support portions A1, A2 that support supported portions 38A, 40B of the motor 14, described in detail later, and circular column shaped shaft bearing portions 26D, 26E that axially support the primary gear 16 and the counter gear 18, project up from the bottom wall 26A. The side wall 26B is provided with a connector portion 26F, to which an external connector is connected.

The upper case 28 is formed in a bottomed box shape open toward the lower case 26 side, and includes a top wall 28A and a side wall 28B, respectively corresponding to the bottom wall 26A and the side wall 26B of the lower case 26. The top wall 28A and the side wall 28B are provided with a pair of support portions B1, B2 and a connector portion 28C, respectively corresponding to the support portions A1, A2 and the connector portion 26F provided at the lower case 26. The top wall 28A is moreover provided with a shaft bearing portion 28D that supports one end of the output shaft 50 provided at the axial center portion of the final gear 20.

The motor 14 is configured including a rotor 32 capable of rotating as a unit with a rotation shaft 30, and an outer shell portion 34 that surrounds the rotor 32. Specifically, the outer shell portion 34 of the motor 14 includes a housing 36 that is formed in a tube shape and configures an outer peripheral portion, and end plates 38, 40 that close off both ends of the housing 36. The housing 36 is formed using a magnetic material, and a segment magnet, not illustrated in the drawings, is fixed to an inner peripheral face of the housing 36. Note that the housing 36 and the segment magnet configure a stator of the motor 14. The supported portion 38A is provided projecting out toward one axial direction side at an axial center portion of the end plate 38 provided on the one axial direction side. The supported portion 38A is formed with an insertion hole 38B, through which the rotation shaft 30 is inserted. The rotation shaft 30 inserted through the insertion hole 38B projects out toward the one axial direction side, and a worm gear 44 is fixed to a projection direction leading end side of the rotation shaft 30 through a collar 42.

The end plate 40 provided at the axial direction other side is configured including a base wall portion 40A, formed in a ring shape, and the supported portion 40B, provided at a central portion of the base wall portion 40A. The supported portion 40B projects out toward the axial direction other side with respect to the base wall portion 40A, and is formed with a circular shaped radial direction outside edge portion as viewed along the axial direction. An end portion on the axial direction other side of the rotation shaft 30 is axially supported at a central portion of the supported portion 40B. In a state closing-off the end portion on the axial direction other side of the housing 36 with the end plate 40, the base wall portion 40A of the end plate 40 described above is disposed further to the one axial direction side than an axial direction other side end 36A of the housing 36. The supported portion 40B of the end plate 40 projects out further toward the axial direction other side than the axial direction other side end 36A of the housing 36.

A pair of terminals 46 that are connected to a brush, not illustrated in the drawings, are provided at the base wall portion 40A of the end plate 40. The terminals 46 project out toward the axial direction other side with respect to the base wall portion 40A.

O-rings 48, each formed in a ring shape as viewed along the axial direction and serving as a resilient member, are attached to outer peripheral sides of the supported portions 38A, 40B of the motor 14 described above. In an attached state of the O-rings 48 to the supported portions 38A, 40B of the motor 14, the supported portions 38A, 40B of the motor 14 are supported by the support portions A1, A2 and the support portions B1, B2 respectively provided at the lower case 26 and the upper case 28. Namely, the O-rings 48 are fitted interposed between the supported portions 38A, 40B of the motor 14 and the support portions A1, A2, B1, B2 of the case 12, such that the motor 14 is supported in a floating state by the case 12.

Rotation of the rotation shaft 30 of the motor 14 described above is transmitted to the output shaft 50 through the worm gear 44, the primary gear 16, the counter gear 18, and the final gear 20.

The primary gear 16 includes a first gear 16A that enmeshes with the worm gear 44 fixed to the rotation shaft 30 of the motor 14, and a second gear 16B that is disposed coaxially to the first gear 16A and is capable of rotating as a unit with the first gear 16A. The primary gear 16 is axially supported by the shaft bearing portion 26D provided at the lower case 26. Note that the second gear 16B is configured with a smaller diameter than the first gear 16A.

The counter gear 18 includes a first gear 18A that enmeshes with the second gear 16B of the primary gear 16, and a second gear 18B that is disposed coaxially to the first gear 18A and is capable of rotating as a unit with the first gear 18A. The counter gear 18 is axially supported by the shaft bearing portion 26E provided at the lower case 26. Note that the second gear 18B is configured with a smaller diameter than the first gear 18A.

The final gear 20 enmeshes with the second gear 18B of the counter gear 18, and the axial center portion of the final gear 20 is fixed to the output shaft 50 by insert molding, press fitting, or the like. Note that a washer 51 is inserted over the output shaft 50.

The power supply terminal 22 is configured including connection portions 22A that connect to the terminals 46 of the motor 14, and a connected portion 22B that connects to a terminal of an external connector, not illustrated in the drawings. The power supply terminal 22 is supported on a support member 52 formed from an insulating material. The support member 52 is fixed to the lower case 26, thereby fixing the power supply terminal 22 to the lower case 26.

Explanation follows regarding the insulation plate 24 that is a relevant portion of the present exemplary embodiment.

Figure 2:
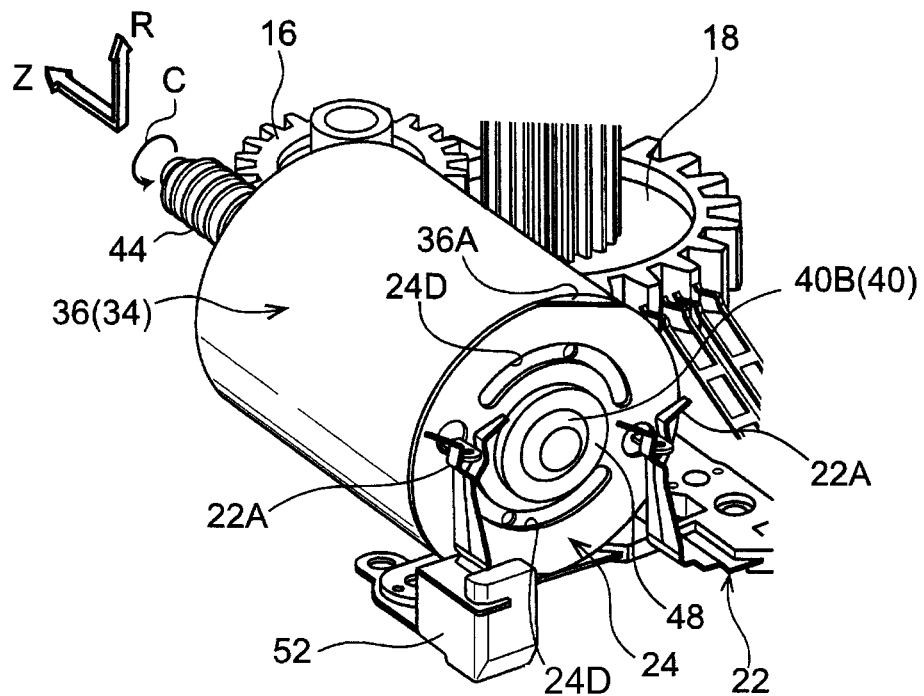
FIG. 2 is a perspective view illustrating components including a motor, a counter gear, and a final gear.

As illustrated in FIG. 2, the insulation plate 24 is formed in a circular plate shape disposed between the housing 36 and the end plate 40 of the motor 14, and the power supply terminal 22. The insulation plate 24 is formed using an insulating material, thereby insulating the housing 36 and end plate 40 of the motor 14 from the power supply terminal 22.

Figure 4:
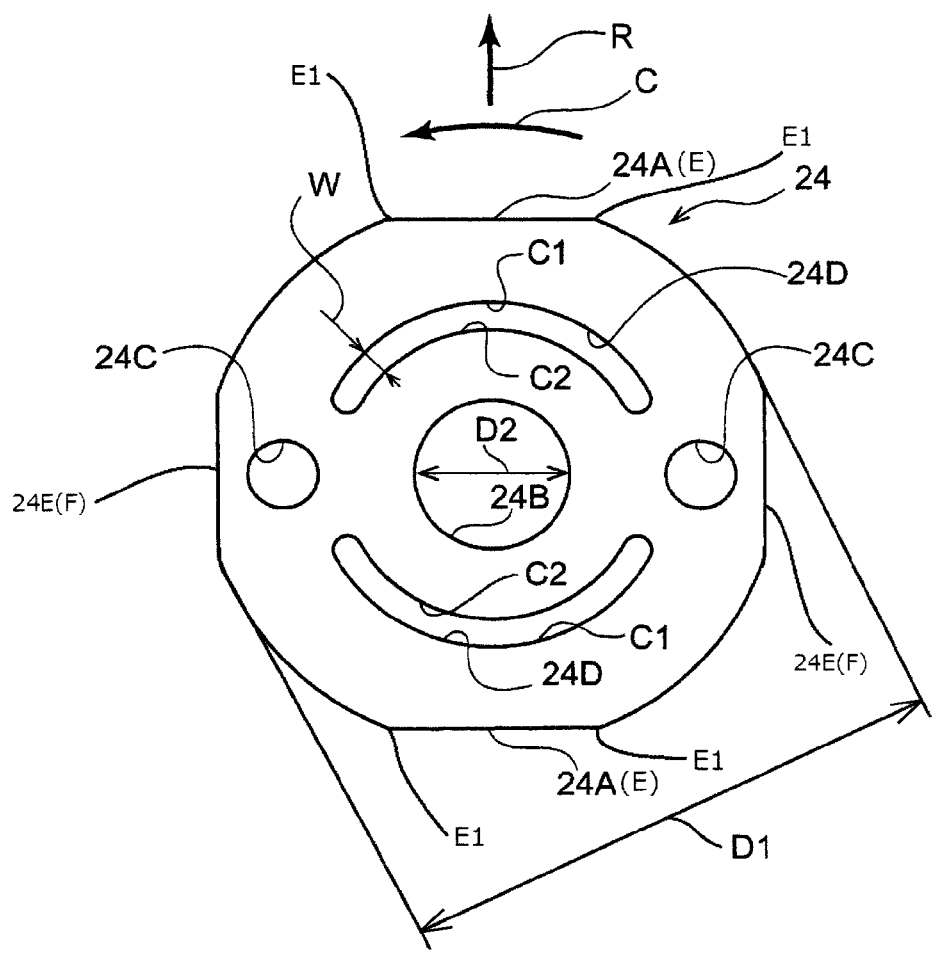
FIG. 4 is a front view of an insulation plate, as viewed along the axial direction.
Figure 5:
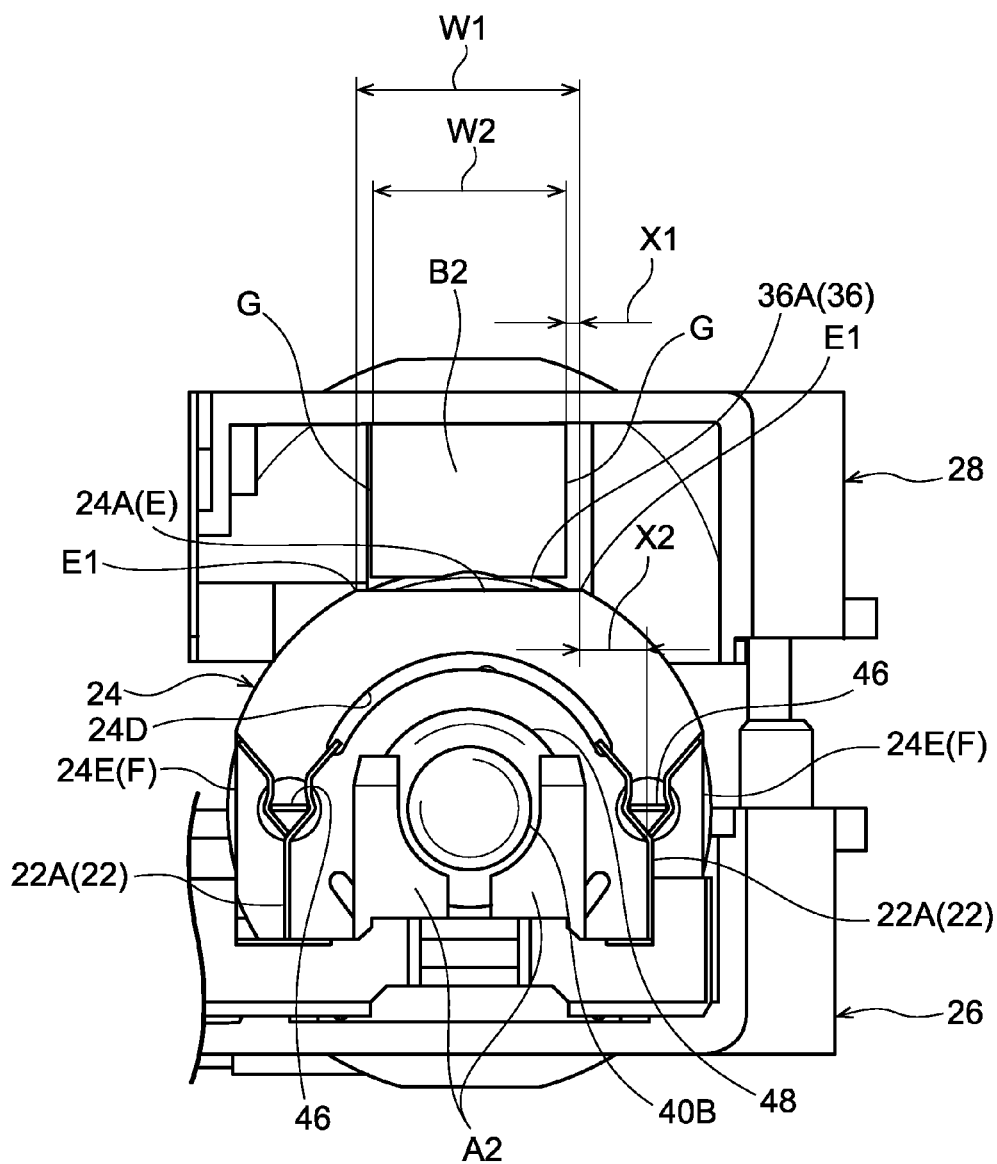
FIG. 5 is an enlarged side view illustrating a motor housed in a lower case.

As illustrated in FIG. 4 and FIG. 5, the external diameter D1 at a location of the maximum diameter of the insulation plate 24 is substantially the same external diameter as the external diameter of the housing 36. D-cutaway portions 24A, serving as escape portions and set with a smaller external diameter than the external diameter D1 of the insulation plate 24, are configured at portions of the outer periphery of the insulation plate 24.

The D-cutaway portions 24A are provided at the insulation plate 24 both at a location on support portion B2 side, and at a location on the support portion A2 side. Edge portions E of the D-cutaway portions 24A are formed in straight line shapes, and the edge portions E of the D-cutaway portions 24A are orthogonal to the extension direction of the support portions A2, B2 in a supported state of the motor 14 by the support portions A1, A2, B1, B2 of the lower case 26 and the upper case 28.

The edge portions E of the D-cutaway portions 24A are positioned further to the radial direction inner side than the housing 36 except for at both ends E1 thereof. Note that in the present exemplary embodiment, D-cutaway portions 24E are formed at positions displaced by 90° in the circumferential direction with respect to the D-cutaway portions 24A, and edge portions F of the D-cutaway portions 24E are positioned further to the radial direction outer side than an inner peripheral face of the housing 36. A width W1 of the D-cutaway portions 24A (the length W1 of the edge portions E of the D-cutaway portions 24A) is moreover set wider than a width W2 of the support portion B2 (a dimension W2 in a direction orthogonal to the extension direction of the support portion B2).

In the present exemplary embodiment, the upper case 28 is attached to the lower case 26 supporting the motor 14 in a state in which both ends G of the support portion B2 are positioned further toward the inner side than both ends E1 of the D-cutaway portions 24A, namely, in a state in which a distance X1 (a distance in the extension direction of the edge portions E of the D-cutaway portions 24A) is maintained from one side end portions E1 of the D-cutaway portions 24A to one end G of the support portion B2. Moreover, in a state in which the motor 14, to which the insulation plate 24 is attached, is supported by the lower case 26, both ends E1 of the D-cutaway portions 24A are positioned further to the central portion side of the motor 14 than base end sides of the connection portions 22A of the power supply terminal 22. Namely, a distance from the one side end E1 of the D-cutaway portion 24A to a base end side of the respective connection portion 22A (a distance in the extension direction of the edge portions E of the D-cutaway portions 24A) is set at X2. There is accordingly no drop in the insulating properties between the connection portions 22A and the housing 36.

A circular shaped opening 24B is formed at the center of the insulation plate 24. The internal diameter D2 of the opening 24B is set slightly larger than the external diameter of the supported portion 40B (see FIG. 1) provided at the end plate 40. As illustrated in FIG. 2, the supported portion 40B provided at the end plate 40 is inserted through the opening 24B of the insulation plate 24, and the O-ring 48 is attached to the supported portion 40B of the end plate 40, thereby preventing the insulation plate 24 from coming away from the motor 14. Namely, a temporary assembly state of the insulation plate 24 to the motor 14 is achieved.

As illustrated in FIG. 4, a pair of insertion holes 24C, through which the terminals 46 (see FIG. 3) of the motor 14 are inserted, are formed at the insulation plate 24 at locations to the radial direction outer side of the opening 24B. The pair of insertion holes 24C are disposed opposing each other across the opening 24B. Namely, the pair of insertion holes 24C are disposed at even intervals (disposed at intervals of 180°) around the circumferential direction.

As illustrated in FIG. 2, a pair of cut-out holes 24D are formed at the insulation plate 24 at locations to the radial direction outer side of locations contacting the O-ring 48, and to the radial direction inner side of the housing 36. As illustrated in FIG. 4, the cut-out holes 24D are formed as elongated holes extending around the circumferential direction of the motor 14. Radial direction outside edge portions C1 and radial direction inside edge portions C2 of the cut-out holes 24D respectively form circular arc shapes about the center of the insulation plate 24 (the center of the opening 24B). Moreover, a radial direction distance W between the respective radial direction outside edge portions C1 of the cut-out holes 24D and radial direction inside edge portions C2 of the cut-out holes 24D, namely the width W of the cut-out holes 24D, is substantially uniform around the circumferential direction. The pair of cut-out holes 24D described above are disposed opposing each other across the opening 24B, and are disposed at positions displaced by 90° in the circumferential direction with respect to the insertion holes 24C.

As illustrated in FIG. 2, in an assembly process of the motor actuator 10, first the supported portion 40B provided at the end plate 40 is inserted through the opening 24B of the insulation plate 24, and one O-ring 48 is attached to the supported portion 40B of the end plate 40. Moreover, as illustrated in FIG. 1, another O-ring 48 is attached to the supported portion 38A of the end plate 38.

Figure 3:
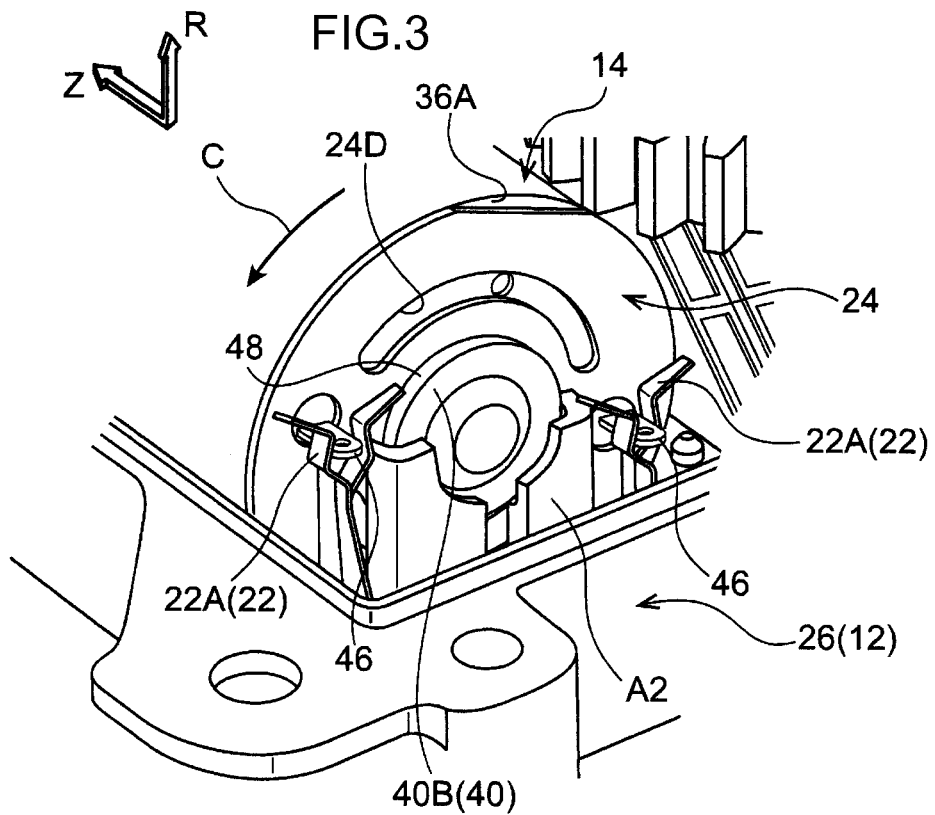
FIG. 3 is an enlarged perspective view illustrating a motor housed in a lower case.

Next, as illustrated in FIG. 1 and FIG. 3, the supported portions 38A, 40B of the motor 14 are respectively supported by the support portions A1, B1 and the support portions A2, B2 provided at the case 12. In the supported state of the supported portions 38A, 40B of the motor 14 by the support portions A1, B1 and the support portions A2, B2 provided at the case 12, the insulation plate 24 is nipped between the axial direction other side end 36A of the housing 36 and the O-ring 48. Namely, the insulation plate 24 flexes in a supported state of the supported portions 38A, 40B of the motor 14 by the support portions A1, B1 and the support portions A2, B2 provided at the case 12.

Operation and Advantageous Effects of the Present Exemplary Embodiment

Explanation follows regarding operation and advantageous effects of the present exemplary embodiment.

As illustrated in FIG. 1, in the motor actuator 10 of the present exemplary embodiment the rotation shaft 30 is rotated by passing current through the motor 14 through the power supply terminal 22. The rotation of the rotation shaft 30 is transmitted to the output shaft 50 through the worm gear 44, the primary gear 16, the counter gear 18, and the final gear 20. Namely, the motor actuator 10 actuates.

Moreover, in the motor actuator 10, the O-rings 48 are fitted interposed between the supported portions 38A, 40B provided at the motor 14, and the support portions of the case (the support portions A1, A2 provided at the lower case 26, and the support portions B1, B2 provided at the upper case 28). Vibration of the motor 14 to the case 12 is accordingly suppressed from being transmitted to the case, enabling a reduction in vibration and a reduction in noise in the motor actuator 10.

In the motor actuator 10, insulating properties between the outer shell portion (the housing 36 and the end plate 40) of the motor and the power supply terminal 22 are secured due to providing the insulation plate 24 between the outer shell portion (the housing 36 and the end plate 40) of the motor 14 and the power supply terminal 22. Moreover, as described above, the insulation plate 24 flexes due to being nipped between the axial direction other side end 36A of the housing 36 of the motor 14 and the O-ring 48. Resilient recovery force of the insulation plate 24 attempting to regain its original shape is accordingly input from the insulation plate 24 to the O-ring 48, and so it might be imagined that the O-ring 48 could come away from between the supported portion 40B of the motor 14 and the support portions A2, B2 of the case 12. However, in the motor actuator 10, this resilient recovery force is attenuated due to forming the cut-out holes 24D in the insulation plate 24 at the locations described above. The O-ring 48 can accordingly be suppressed from coming away from between the supported portion 40B of the motor 14 and the support portions A2, B2 of the case 12.

Moreover, in the present exemplary embodiment, the radial direction outside edge portions C1 and the radial direction inside edge portions C2 of the cut-out holes 24D formed at the insulation plate 24 are formed in circular arc shapes as viewed along the axial direction. The load distribution of the resilient recovery force input from the insulation plate 24 to the O-ring 48 can accordingly be made more uniform around the circumferential direction of the O-ring 48. The O-ring 48 can accordingly be even better suppressed from coming away from between the supported portion 40B of the motor 14 and the support portions A2, B2 of the case 12.

Figure 6:
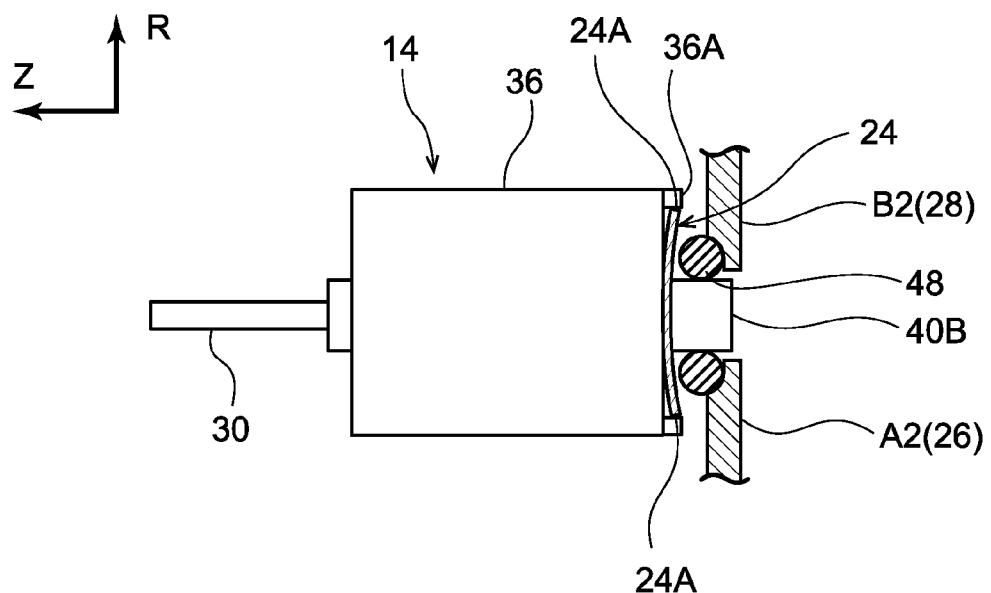
FIG. 6 is a side view schematically illustrating an attachment process of an upper case to a lower case, with a supported portion of a motor in a supported state by a support portion of the lower case.

Moreover, in the present exemplary embodiment, the insulation plate 24 is provided with the D-cutaway portions 24A, configured as described above. Accordingly, as illustrated in FIG. 6, a location of the insulation plate 24 on the side of the support portion B2 provided at the upper case 28 is not liable to stick out at the axial direction other side end 36A of the housing 36 when nipping the insulation plate 24 between the housing 36 and the O-ring 48. The support portion B2 of the upper case 28 can accordingly be suppressed from catching on the insulation plate 24 when attaching the upper case 28 to the lower case 26 in a supported state of the supported portions 38A, 40B of the motor 14 by the support portions A1, A2 of the lower case 26.

Figure 7:
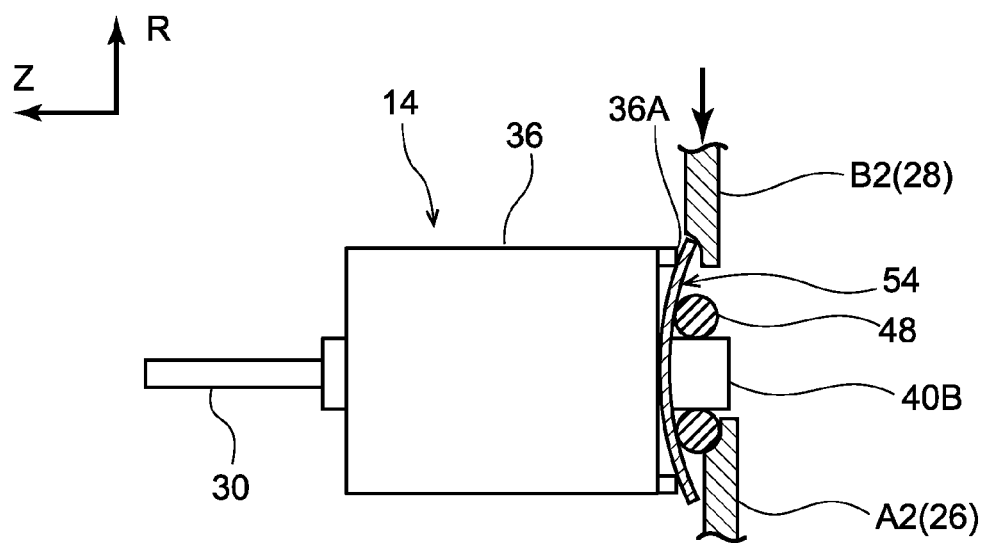
FIG. 7 is a side view schematically illustrating an attachment process of an upper case to a lower case, with a supported portion of a motor in a supported state by a support portion of the lower case in a Comparative Example.

Note that as illustrated in FIG. 7, in an insulation plate 54 according to a Comparative Example that is not provided with the D-cutaway portions 24A, it is conceivable that a radial direction outside end portion of the insulation plate 54 could stick out at the axial direction other side end 36A of the housing 36 when nipping the insulation plate 54 between the housing 36 and the O-ring 48. In such cases, sometimes the support portion B2 of the upper case 28 catches on the insulation plate 54 when attaching the upper case 28 to the lower case 26 in a supported state of the supported portions 38A, 40B of the motor 14 by the support portions A1, A2 of the lower case 26. This is detrimental to the ease of operation when attaching the upper case 28 to the lower case 26.

In the present exemplary embodiment, setting the width W1 of the D-cutaway portions 24A and setting the width W2 of the support portion B2 provided at the upper case 28 as described above enables the support portion B2 of the upper case 28 to be even further suppressed from catching on the insulation plate 24 when attaching the upper case 28 to the lower case 26.

In the present exemplary embodiment, the D-cutaway portions 24A are provided at both the upper case 28 side and the lower case 26 side of the insulation plate 24. Restrictions to the direction of the insulation plate 24 when attaching the insulation plate 24 to the motor 14 can accordingly be relaxed. Namely, this allows the insulation plate 24 to be attached to the motor 14 when rotated by 180° around the circumferential direction. Good ease of operation can accordingly be obtained during assembly of the insulation plate 24 to the motor 14.

Note that in the present exemplary embodiment, explanation has been given regarding an example in which the ring shaped O-rings 48 are respectively fitted interposed between the supported portions 38A, 40B of the motor 14 and the support portions A1, A2, B1, B2 of the case 12, however the present invention is not limited thereto. The shape of the resilient member fitted interposed between the supported portions of the motor and the support portions of the case may be set as appropriate in consideration of the shape of the supported portions of the motor, and the like. Moreover, the shape and dimensions of the cut-out holes formed at the insulation plate may be set as appropriate in consideration of the distribution of load input to the resilient member from the insulating member, and the like.

In the present exemplary embodiment, explanation has been given regarding an example in which the D-cutaway portions 24A are provided at both the upper case 28 side and the lower case 26 side of the insulation plate 24, however the present invention is not limited thereto. Configuration may be made such that a D-cut portion 24A is only formed on the upper case 28 side of the insulation plate 24.

In the present exemplary embodiment, explanation has been given regarding an example in which the width W1 of the D-cutaway portions 24A is set wider than the width W2 of the support portion B2 provided at the upper case 28, however the present invention is not limited thereto, and the width W1 of the D-cutaway portions 24A and the width W2 of the support portion B2 may be made the same as each other.

Figure 8:
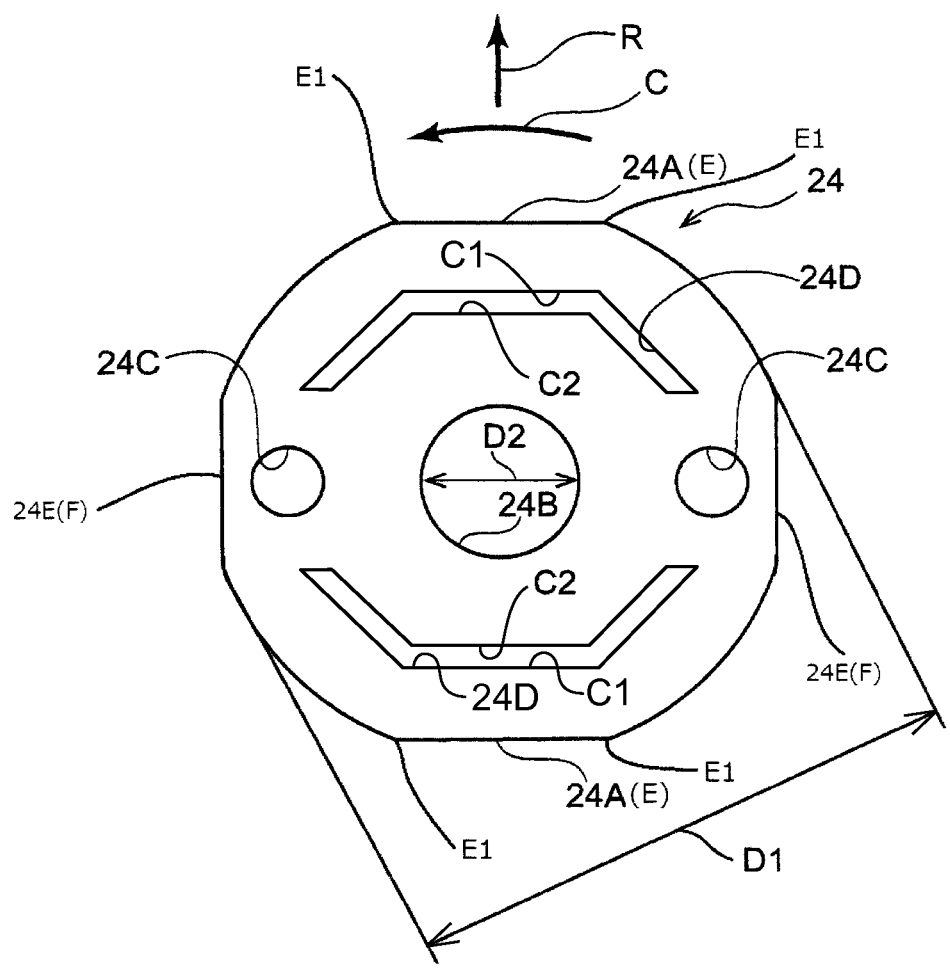
FIG. 8 is a face-on view of an insulation plate according to a modified example as viewed along the axial direction.

In the present exemplary embodiment, explanation has been given of an example in which the radial direction outside edge portions C1 and radial direction inside edge portions C2 of the cut-out holes 24D are formed in circular arc shapes; however the present invention is not limited thereto. For example, as illustrated in FIG. 8, the radial direction outside edge portions C1 and radial direction inside edge portions C2 of the cut-out holes 24D may be configured bent into protruding shapes toward the support portions A2, B2 as viewed along the axial direction. Moreover, a portion of the cut-out hole edge portions may be curved or bent into a protruding shape toward the support portions A2, B2 as viewed along the axial direction.

Explanation has been given regarding one exemplary embodiment of the present invention, however there is no limitation to the above, and obviously various modifications other than those described above may be implemented within a range not departing from the spirit of the present invention.

What is claimed is:

1. A motor actuator comprising:
   a motor including an outer shell portion internally provided with a rotor that rotates as a unit with a rotation shaft, and supported portions respectively provided at both axial direction end portions of the outer shell portion;
   a power supply terminal connected to the motor;
   a case that internally houses the motor, and that includes support portions that support the supported portions;
   a resilient member that is fitted interposed between each of the support portions and the supported portions, and that suppresses vibration of the motor from being transmitted to the case; and
   an insulating member that is disposed between the outer shell portion and the power supply terminal, that is nipped between an outer peripheral portion of the outer shell portion and the resilient member, and that is formed with a cut-out hole at a location to the radial direction outer side of a location in contact with the resilient member, and at the radial direction inner side of an outer peripheral portion of the outer shell portion.

2. The motor actuator of claim 1, wherein:
   at least a portion of an edge portion of the cut-out hole is curved or bent into a protruding shape toward the support portion side as viewed along the axial direction.

3. The motor actuator of claim 1, wherein:
   an edge portion of the supported portion is formed in a circular shape as viewed along the axial direction;
   the resilient member is configured by an O-ring that is disposed at the radial direction outer side of the supported portion and that is formed in a ring shape as viewed along the axial direction; and
   a radial direction outside edge portion and a radial direction inside edge portion of the cut-out hole are respectively formed in circular arc shapes as viewed along the axial direction.

4. A motor actuator comprising:
   a motor including an outer shell portion internally provided with a rotor that rotates as a unit with a rotation shaft, and supported portions respectively provided at both axial direction end portions of the outer shell portion;
   a power supply terminal connected to the motor;
   a case that internally houses the motor, and that includes support portions that support the supported portions;
   a resilient member that is fitted interposed between each of the support portions and the supported portions, and that suppresses vibration of the motor from being transmitted to the case; and
   an insulating member that is disposed between the outer shell portion and the power supply terminal, and that is nipped between an outer peripheral portion of the outer shell portion and the resilient member;

wherein the case is configured with a split structure configured by attaching a first case to a second case, with the support portions respectively provided at the first case and the second case, and wherein a location of the insulating member on the side of the support portion provided at the first case configures an escape portion with an edge portion positioned further to the radial direction inner side than the outer peripheral portion of the outer shell portion.

5. The motor actuator of claim 3, wherein:

a dimension of the escape portion as viewed along the axial direction of the motor is set larger than a dimension of the support portion provided at the first case as viewed along the axial direction of the motor.

6. The motor actuator of claim 3, wherein:

escape portions are provided at both a location of the insulating member on the side of the support portion provided at the first case, and a location of the insulating member on the side of the support portion provided at the second case.

* * * * *